(12) United States Patent
Fallenstein (10) Patent No.: US 6,721,632 B2
(45) Date of Patent: Apr. 13, 2004

(54) WIRELESS EXCHANGE BETWEEN VEHICLE-BORNE COMMUNICATIONS SYSTEMS

(75) Inventor: Michael John Fallenstein, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 130 days.

(21) Appl. No.: 10/068,334

(22) Filed: Feb. 5, 2002

(65) Prior Publication Data

US 2003/0146850 A1 Aug. 7, 2003

(51) Int. Cl.⁷ .............................. G06F 7/00; G08G 1/09
(52) U.S. Cl. ........................................................ 701/1
(58) Field of Search ...................... 701/1, 33; 713/170, 713/172

(56) References Cited

U.S. PATENT DOCUMENTS

| | | | |
|---|---|---|---|
| 4,706,086 A | * 11/1987 | Panizza | 340/902 |
| 5,432,509 A | 7/1995 | Kajiwara | 340/903 |
| 5,546,308 A | 8/1996 | Yamamoto | 364/426.04 |
| 5,847,663 A | * 12/1998 | Chasek | 340/905 |
| 5,983,161 A | 11/1999 | Lemelson et al. | 701/301 |
| 6,121,896 A | 9/2000 | Rahman | 340/902 |
| 6,161,071 A | 12/2000 | Shuman et al. | 701/48 |
| 6,169,940 B1 | 1/2001 | Jitsukata et al. | 701/23 |
| 6,185,496 B1 | 2/2001 | Matsuno | 701/70 |
| 6,202,020 B1 | 3/2001 | Kyrtsos | 701/80 |
| 6,225,918 B1 | 5/2001 | Kam | 340/903 |
| 6,226,389 B1 | 5/2001 | Lemelson et al. | 382/104 |
| 6,275,773 B1 | 8/2001 | Lemelson et al. | 701/301 |
| 6,278,928 B1 | 8/2001 | Aruga et al. | 701/65 |
| 2002/0198660 A1 | * 12/2002 | Lutter et al. | 701/301 |

FOREIGN PATENT DOCUMENTS

WO    WO 00/40038    * 7/2000

OTHER PUBLICATIONS

U.S. patent application Ser. No. 09/598,815, "Prediction and Compensation for Land Vehicle Dynamics Based on Feedforward Road Conditions," filed Jun. 21, 2000.

* cited by examiner

Primary Examiner—Michael J. Zanelli
(74) Attorney, Agent, or Firm—Moser, Patterson & Sheridan LLP (57) ABSTRACT

Method and apparatus for communicating information between vehicles and/or other systems, including the Internet. Such information may include vehicle operations information, emergency information, email and any other form of information. To facilitate communications each vehicle is equipped with an onboard communications system. In one embodiment, the onboard communications systems are configured to transmit/receive tokens to other systems within a predefined range (as determined by the transmission equipment) without regard for whether the information tokens are addressed to a particular recipient.

32 Claims, 4 Drawing Sheets

WIRELESS EXCHANGE BETWEEN VEHICLE-BORNE COMMUNICATIONS SYSTEMS

BACKGROUND OF THE INVENTION

1. Field of the Invention

The present invention generally relates to a vehicular communications system. More particularly, a vehicular wireless communications system is provided for transmitting/receiving information between other vehicles and/or other communications systems, including the Internet.

2. Description of the Related Art

Road vehicles are a primary form of transportation for millions of people. Usage of such vehicles is pervasive and includes leisure, business, sport, etc. Of paramount importance to occupants of vehicles is safety and comfort. To this end, numerous technological advances have been made including, for example, antilock braking systems (ABS), suspension control systems, throttle control systems, passenger restraint systems (e.g., airbags), traction control systems, navigation systems and the like.

As such, state-of-the-art vehicles are now equipped with a plurality of sensors, detectors and receivers configured for collecting a wide variety of information. However, this information is generally consumed by (for use by) the collecting vehicle. For example, a vehicle equipped with a traction control sensor uses the information collected by the sensor to adjust driving parameters (e.g., wheel torque) of the vehicle. Each subsequent vehicle passing over the same length of road may independently collect the same information and make similar adjustments to its driving parameters. As such, the collected information is not shared between vehicles.

Therefore, there is a need for a vehicular communications system allowing for communications between nearby vehicles.

SUMMARY OF THE INVENTION

The present invention generally provides a method and system for communicating information between vehicles and/or other communications systems, including the Internet.

One embodiment provides a method of communicating information between vehicles, comprising (a) receiving, at a vehicle-borne receiver, a first information token from a proximately located vehicle, wherein the first information token contains at least data content; (b) determining whether the first information token is private or public; (c) if the first information token is private, transmitting the first information token, from a vehicle-borne transmitter, without reading the data content of the first information token; and (d) if the first information token is public, reading the data content of the first information token.

Another embodiment provides a method of communicating information between vehicles, in which each vehicle comprises a vehicle-borne short-range receiver; and a vehicle-borne short-range transmitter. The method comprises (a) receiving, at the vehicle-borne short-range receiver, information tokens from a token transmitter within a predefined range without regard for an identity of the token transmitter and without regard for whether the received information tokens are addressed to a particular recipient; and (b) transmitting, from the vehicle-borne short-range transmitter, at least some of the information tokens to any token receiver within a predefined range without regard for whether the information tokens are addressed to a particular destination.

Yet another embodiment provides a vehicle-borne system, comprising a short range transmitter; a short-range receiver; and an onboard computer system communicably connected to the short-range transmitter and the short-range receiver. When executing a token processing program, the onboard computer system is configured to perform an operation comprising: (a) receiving, at the short-rage receiver, information tokens from a token transmitter within a predefined range without regard for an identity of the token transmitter and without regard for whether the received information tokens are addressed to a particular recipient; and (b) transmitting, from the short-range transmitter, at least some of the information tokens to any token receiver within a predefined range without regard for whether the information tokens are addressed to a particular destination.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and system for communicating information between vehicles. Such information may include vehicle operations information (such as traction information, visibility information, traffic congestion information, etc.), emergency information, email and any other form of information. To facilitate communications each vehicle is equipped with an onboard communications system. Preferably, the onboard communications system includes a short range wireless communications system, whereby information is only exchanged between proximate vehicles (e.g., within a few hundred feet). In one aspect, the particular distance at which a vehicle is sufficiently "proximate" is dependent upon the transmission and receiving devices, as will be understood by those skilled in the art.

In one embodiment, the onboard communications systems are configured to transmit/receive tokens to other systems within a predefined range (as determined by the transmission equipment) without regard for whether the information tokens are addressed to a particular recipient. As such, the onboard communications systems form a network of "token couriers" continuously exchanging tokens.

One embodiment of the invention is implemented as a program product for use with a computer system such as, for example, the onboard computer processing system 100 shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
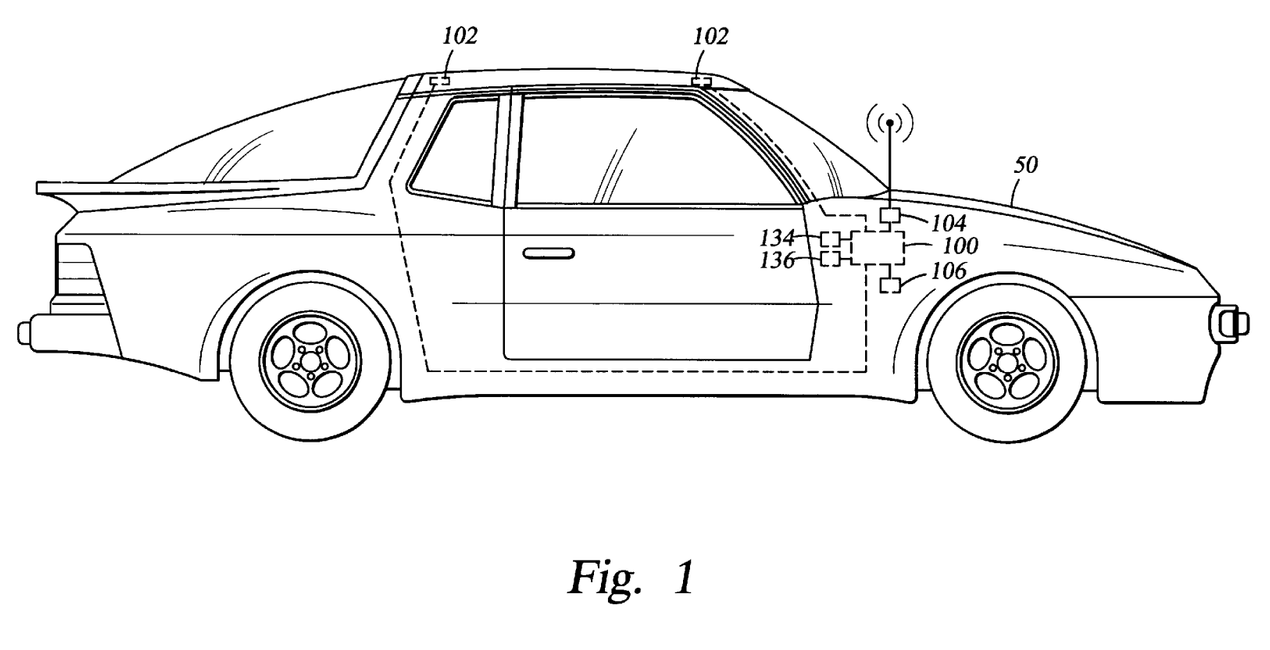
FIG. 1 is a side view of a vehicle equipped with an onboard computer system having communications capabilities.

FIG. 1 is a schematic representation of a vehicle 50 having an onboard computer processing system 100. The onboard computer processing system 100 is advantageously configured for receiving, processing and transmitting information including environmental information and vehicle operations information. In one embodiment, environmental information and vehicle operations information is collected by a plurality of sensors/detectors $102_1$, $102_2$, . . . $102_N$ (collectively referred to herein as sensors 102) coupled to the onboard computer processing system 100. The sensors 102 may be adapted to receive digital and/or analog signals. Illustrative sensors include digital sensors, audio sensors and video sensors. More particularly, the sensors 102 may be adapted to sense environment conditions or operating conditions of the vehicle 50 including wind, temperature, precipitation, visibility, wheel traction, braking, suspension, etc. The positioning of the sensors 102 in FIG. 1 is merely illustrative and the actual positioning of the sensors will depend on the type of sensor and its intended use.

The onboard computer processing system 100 further includes, or is connected to, a transceiver 104, a navigation system 106, input devices 134 and output devices 136. In one embodiment, the transceiver 104 is a short range transceiver. Illustrative transceivers which may be used to advantage include 802.11a, 802.11b, Bluetooth and the like. The transceiver 104 is configured to transmit and receive a variety of information including the data detected by the sensors 102 and information provided by the navigation system 106. Other information which may be received/transmitted by the transceiver 104 includes emergency information and information which is typically sent over wide area networks, such as the Internet, including video data, voice data, e-mail, etc. In one embodiment, information is exchanged between vehicles in the form of communication tokens. In general, tokens are digital packets which contain data. Tokens and embodiments for communicating tokens will be described in more detail below.

The navigation system 106 is any component or combination of components capable of determining a direction of travel of the vehicle 50. In one embodiment, navigation system 106 is a compass (which may be an electric compass). In one embodiment, the direction of travel is transmitted, via the transceiver 104, to other vehicles in order to allow the vehicles to determine relative motion with respect to one another.

The input device 134 can be any device(s) adapted to provide input to the onboard computer processing system 100. For example, a keyboard, keypad, light pen, touch screen, button, mouse, trackball, speech recognition unit, volume control, cell phone control and a radio signal mixer could be used. The output devices 136 can include warning lights, a graphics/text display, speakers, etc. Although shown separately, the output devices 136 and the input devices 134 could be combined. For example, a display screen with an integrated touch screen and a display with an integrated key word, or a speech recognition unit combined with a text speech converter could be used.

Figure 2:
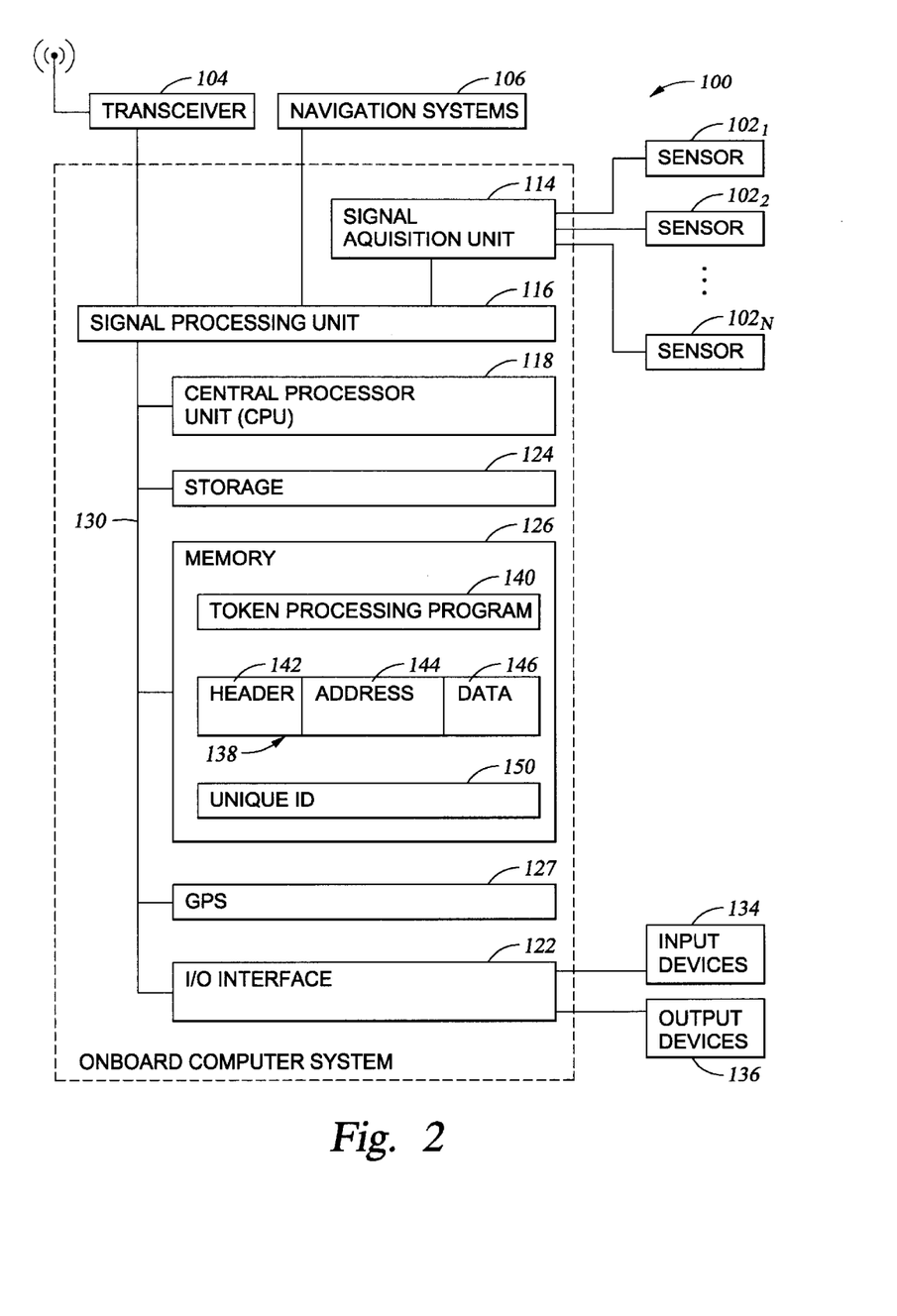
FIG. 2 is a schematic diagram of an onboard computer system for a vehicle.

FIG. 2 shows a more detailed embodiment of the onboard computer processing system 100 of FIG. 1. The onboard computer processing system 100 generally comprises various processing hardware and software products. Specifically, the onboard computer processing system 100 includes a signal acquisition unit 114, a signal processing unit 116, a central processing unit (CPU) 118, an I/O interface 122, storage 124, and memory 126. The components of the onboard computer processing system 100 are connected by a bus line 130. The sensors 102 are connected to an appropriate acquisition unit 114 according to the type of signal received by the sensors 102. Accordingly, digital sensors may be coupled to a digital signal acquisition unit and audio sensors and video sensors may be coupled to an analog signal acquisition unit. The signal acquisition unit 114 may be any of a variety of interface units and/or signal converters. The signal acquisition unit 114 is connected to the signal processor unit 116 which includes circuitry adapted to process the signals received from the acquisition unit 114. The I/O interface 122 may be any entry/exit device adapted to control and synchronize the flow of data into and out of the CPU 118 from and to peripheral devices such as input devices 134 and output devices 136.

Storage 124 can be any known or unknown storage medium including a Direct Access Storage Device (DASD), a floppy disk drive, an optical storage device and the like. Although storage 124 is shown as a single unit, it could be any combination of fixed and/or removable storage devices, such as fixed disk drivers, floppy disk drivers, tape drives, removable memory cards, or optical storage. Memory 126 and storage 124 could be part of one virtual address space spanning multiple primary and secondary storage devices. Although not shown, the storage 124 preferably also includes the configuration settings for the onboard computer processing system 100.

Memory 126 is preferably a random access memory (RAM) sufficiently large to hold the necessary programming and data structures of the invention. While memory 126 is shown as a single entity, it should be understood that memory 126 may comprise a plurality of modules, and that the memory 126 may exist at multiple levels, from high speed registers and caches to lower speed but larger DRAM chips. The contents of memory 126 can be loaded from and stored to the storage 124 as needed by the CPU 118.

Illustratively, memory 126 is shown containing a token 138 and a token processing program 140. As described above, tokens are digital packets. Illustratively, the token 138 contains a security header 142, an address 144, and data 146. The security header 142 identifies the token 138 as either public or private. If the token is designated as public, the token need not contain an address 144 and any recipient of the token can access the data 146. If the token is designated as private, only the recipient designated by the address 144 can access the data 146. In the case of private tokens, the data 146 may be encrypted to prevent unauthorized access. The handling of tokens (e.g., creating tokens, transmitting and receiving tokens, determining whether a token is public or private, reading tokens, etc.) is performed by the onboard computer system 100 when configured with the token processing program 140. Additional aspects for communicating tokens between systems executing a token processing program will be described below.

The memory 126 further includes a unique identifier 150. In one embodiment, each onboard computer system 100 includes a unique identifier 150 in order to allow each of the onboard computer systems to distinguish between one another. To this end, the unique identifier 150 may be selectively broadcasting to nearby receivers. In one embodiment, the unique identifier 150 is used to approximate the location of the onboard computer system 100, as will be described below.

The foregoing embodiments are merely illustrative and persons skilled in the art will recognize numerous embodiments within the scope of the invention. For example, although shown as an automobile in FIG. 1, the vehicle 50 equipped with the system 100 may broadly be defined to include any form of transportation including water vehicles (e.g., boats), aircraft, bicycles, etc. Further, it is understood that the one or more of the components of the system 100 shown in FIGS. 1 and 2 may be combined. For example, in one embodiment, the memory 126 can contain signal processing programming, which, when executed by the CPU 118, performs the functions of the signal processor unit 116, thereby eliminating the need for a separate signal processor unit 116. Further, the system 100 can include additional, alternative or fewer components according to a particular implementation. Further, the system 100 may or may not be an integral component of the vehicle 50. For example, in one embodiment, the onboard computer system 100 includes a personal digital assistant (PDA) configured to transmit and receive tokens. In section embodiment, it is contemplated that the PDA is capable of wireless communications with a plurality of sensors disposed on the vehicle. Other computer systems which may be used to advantage as onboard computer systems include laptops, mobile telephones and the like.

Figure 3:
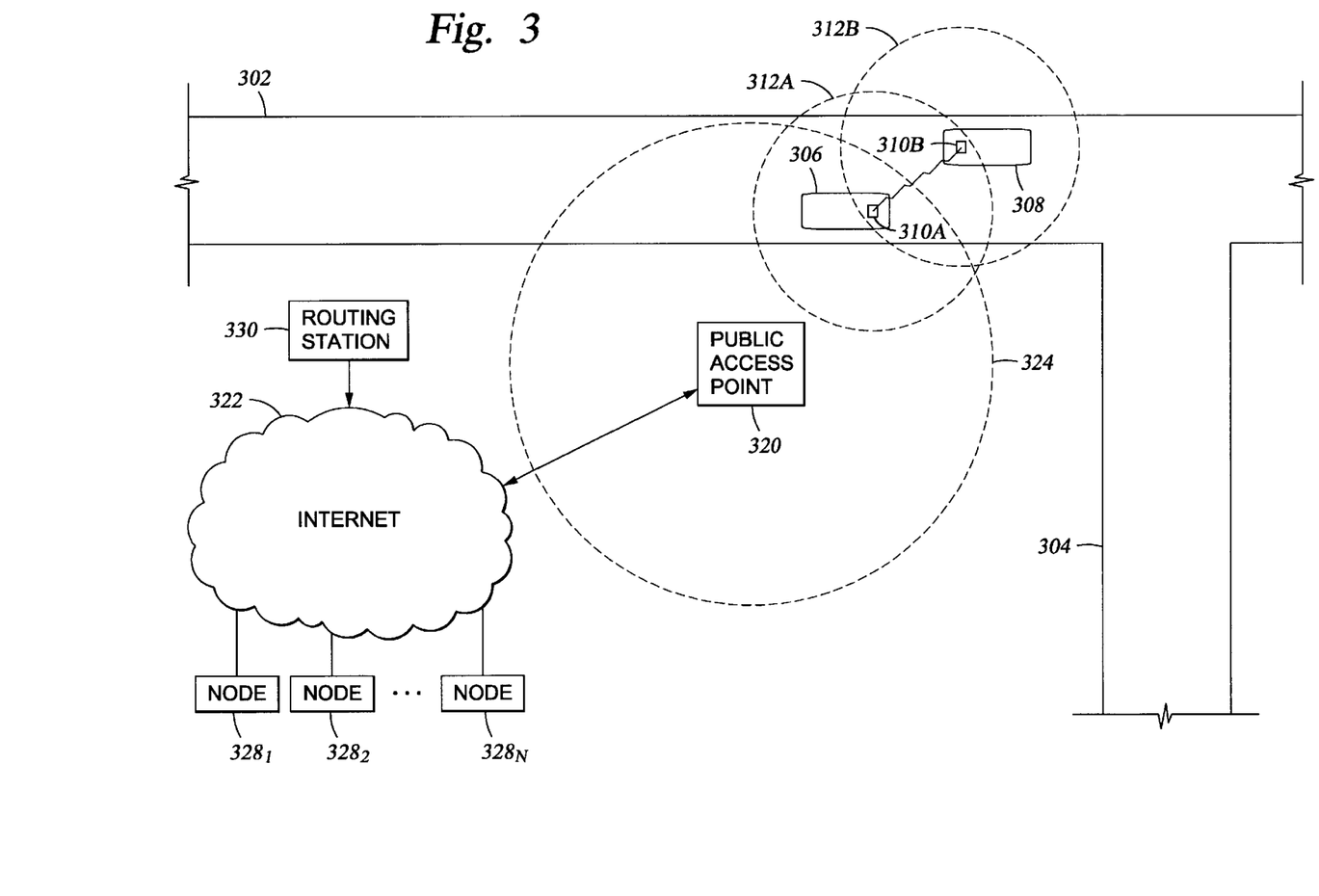
FIG. 3 is a top view of a road grid illustrating communications between vehicles and public access points.

Referring now to FIG. 3, a top view of a road grid is shown. Specifically, a pair of orthogonally related road segments 302, 304 is shown. A first car 306 and a second car 308 are traversing the first road segment 302 in opposite directions and toward one another. Each of the cars 306, 308 is equipped with an onboard computer system 310A, 310B (such as the onboard computer system 100 shown in FIG. 2) which includes at least a transceiver. The cars 306, 308 are capable of transmitting and receiving within a predefined range 312A, 312B according to the specifications of the onboard transceiver. Illustratively, the onboard computer systems 310A–B constantly send signals and listen for other systems with which to communicate. Once the two onboard computer systems 310A–B are within range (as shown in FIG. 3) the systems 310 may exchange tokens.

In one embodiment, the computer systems 310A–B are also configured to communicate with public access points 320. In one aspect, a public access point 320 is any communication system which provides an entry/exit point to a wide area network, such as the Internet 322. Transmissions from the onboard computer systems 310A–B to the public access point 320 can be made when the onboard computer system 310 and the public access 320 are within range 312A–B, as defined by the capability of onboard transceivers. Likewise, transmissions from the public access point 320 to the onboard computer systems 310A–B depend upon the transmission power of the public access point 320. FIG. 3 shows a range 324 representative of the broadcasting capability of the public access point 320. In one embodiment, the range 324 is larger than the ranges 312A–B.

The provision of public access points allows for wide area communications using only short range communication facilities. Because each public access point is networked with a wide area network (e.g. the Internet) tokens received from passing vehicles can be rapidly disseminated to a plurality of nodes $328_1, 328_2 \ldots 328_N$, (collectively, nodes 328) including other public access points which may be located at great distances from one another. Further, in one embodiment, the public access points are utilized to ascertain approximate locations of the vehicles equipped with onboard computer systems. For example, passing vehicles may transmit their respective unique IDs 150 (see FIG. 2) to public access points, which have their own unique identifier. The unique IDs (for the onboard computer system and the access point) may then be relayed via the Internet to any networked device or system, including, for example, a routing station 330. The routing station 330 is generally configured to log the unique IDs and utilize the unique IDs in routing tokens to the onboard computer systems. For example, upon receiving a token from a node 328 addressed to a particular onboard computer system (i.e., containing a unique ID), the routing station may access its database to look up the logged unique ID for the onboard computer system and associated public access point unique ID. The routing station 330 may then transmit the token to the public access point associated with the public access point unique ID or to a plurality of public access points within a predetermined radius of the public access point associated with the public access point unique ID. In this manner, the token is likely to arrive at its intended destination and the network is not unnecessarily congested as a result of indiscriminately transmitting the token to each and every public access point. Rather, the token is only broadcast of those public access points which are in likely proximity to the intended recipient vehicle of the token based on the last known location of the recipient vehicle.

Figure 4:
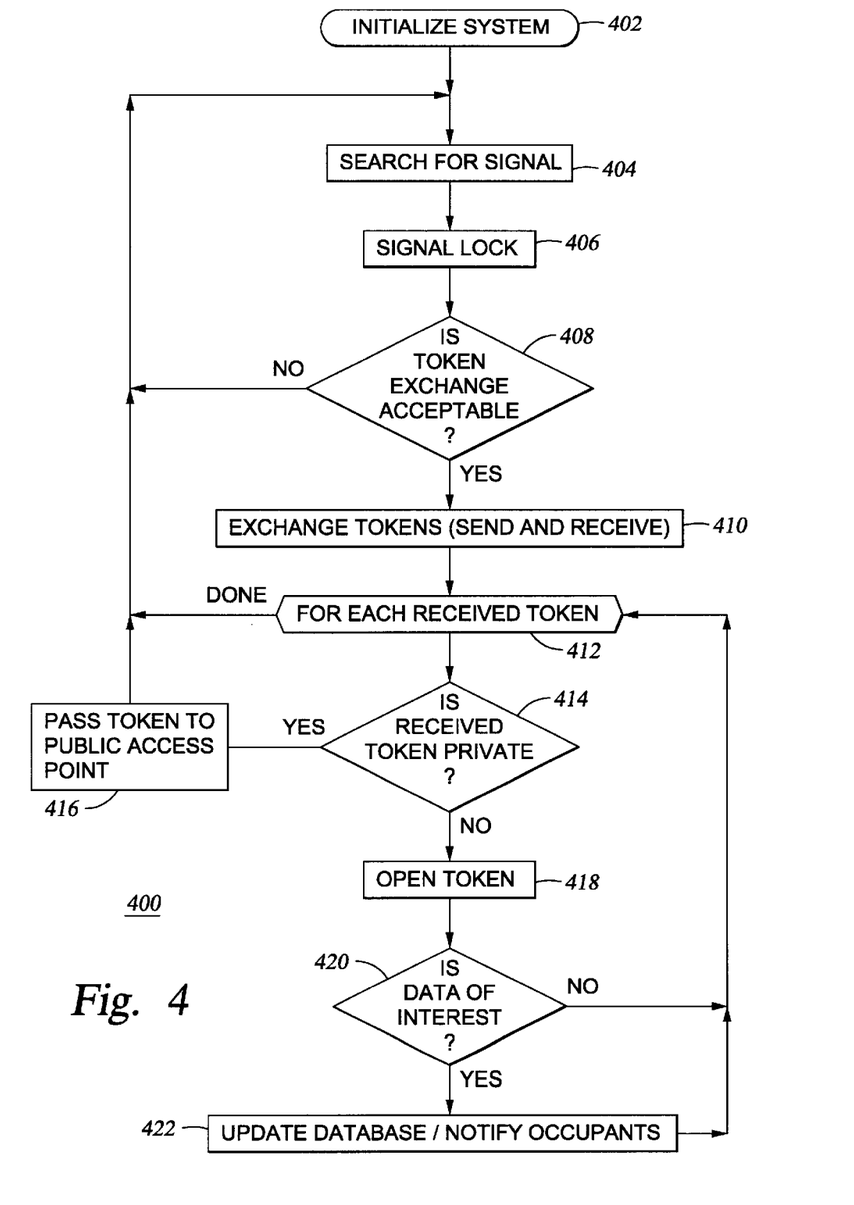
FIG. 4 is a flowchart illustrating communications between onboard computer systems.

Referring now to FIG. 4, a method 400 is shown illustrating the operation of an onboard computer system (such as the one shown in FIG. 2). The method 400 is entered at step 402 where the onboard computer system is initialized (e.g., when the vehicle carrying the onboard computer system is started). At step 404, the onboard computer system begins listening for other signals. Once another signal is detected, the signal is locked at step 406. At step 408, the onboard computer system queries whether token exchange is acceptable. In one embodiment, step 408 includes determining the identity of the sender, e.g., by examining the sender's unique identifier. The receiving computer can then determine whether communications are being accepted from the identified sender. Whether or not to accept communications from a particular sender(s) is, at least in one embodiment, user configurable. In any case, if step 408 is answered negatively, the method 400 returns to step 404 to search for another signal. If step 408 is answered affirmatively, tokens are exchanged between the onboard computer systems at step 410. At step 412, the method 400 enters a loop which is executed for each received token. Initially, a determination is made, at step 414, as to whether the received token is private or public. If the token is private, processing proceeds to step 416 where the token is marked for transmission to a public access point. The method 400 then returns to step 404 to search for another signal. Otherwise, if the token is public, processing proceeds from step 414 to step 418 where the token is opened and read. At step 420, a determination is made as to whether the data contained in the token is of interest. For example, in some cases an operator of the vehicle may have configured the onboard computer system to disregard tokens containing particular types of information (e.g., weather information). If the data is not of interest, the method 400 returns to step 412 to begin processing the next received token. Otherwise, processing proceeds to step 422 where the necessary databases are updated and/or the occupants of the vehicle are notified of the token information. In one embodiment, the received token information is used to adjust the operating parameters of the vehicle at which the token information is received. For example, the token information may include road condition information collected by a vehicle which recently traversed a road segment likely to be traversed by the recipient computer of the token information within a short period of time. As such, the recipient computer of the token information may utilize the token information in order to enhance the safety and/or comfort of the occupants of the vehicle. In any case, processing then returns from step 422 to step 412.

In some embodiments, it may be desirable to limit the propagation of tokens in order to avoid congesting networks. To this end, a number of methods and mechanisms are contemplated. For example, in one embodiment the tokens are time stamped and then discarded/deleted by any device carrying the token after the expiration of a predetermined period of time. In another embodiment, tokens are held by a receiving onboard computer system for a period of time before retransmission in order to avoid sending the token back to the same vehicular onboard computer system from which the token was received. In another embodiment, non-emergency public tokens which propagate a predetermined distance from their original source (i.e., where the token was created) may be discarded/deleted because they are likely of a little or no value to recipients too far removed from the original source. In some cases, implementation of the foregoing embodiments may require the tokens to be configured with additional information, as will be recognized by persons skilled in the art. Persons skilled in the art will also recognize other advantageous embodiments.

Further, an onboard computer system receiving token information may process the token information according to its source. For example, token information may be categorized as first-hand information (i.e., received from the system creating the token) or second-hand information (i.e., received from a system other than the creator of the token). This categorization may then be used to prioritize the token.

In one embodiment, a user may configure an onboard computer system to output received second-hand token information only if first-hand token information is not available.

While the foregoing is directed to embodiments of the present invention, other and further embodiments of the invention may be devised without departing from the basic scope thereof, and the scope thereof is determined by the claims that follow.

What is claimed is:

1. A method of communicating information between vehicles, comprising:
   receiving, at a vehicle-borne receiver, a first information token from a proximately located vehicle, wherein the first information token contains at least data content;
   determining whether the first information token is private or public;
   if the first information token is private, transmitting the first information token, from a vehicle-borne transmitter, without reading the data content of the first information token; and
   if the first information token is public, reading the data content of the first information token.

2. The method of claim 1, wherein transmitting comprises transmitting the first information token to at least one of another proximately located vehicle and a public access point to a wide area network.

3. The method of claim 2, wherein the wide area network is the Internet.

4. The method of claim 1, wherein the vehicle-borne receiver is a short-range receiver and the vehicle-borne transmitter is a short-range transmitter.

5. The method of claim 1, wherein the first information token has been received and transmitted by a plurality of vehicles prior to being received by the vehicle-borne receiver.

6. The method of claim 1, wherein the first information token contains at least one of: sensor information collected by a sensor of another proximately located vehicle and emergency information transmitted from the another proximately located vehicle.

7. The method of claim 1, further comprising:
   receiving, at the vehicle-borne receiver, a second information token from a public access point to a wide area network, wherein the second information token contains at least a destination address and data content;
   determining whether the second information token is private or public;
   if the second information token is private, transmitting the second information token, from the vehicle-borne transmitter, without reading the data content of the second information token; and
   if the second information token is public, reading the data content of the second information token.

8. The method of claim 7, wherein determining whether the first and second information token are public or private comprises determining whether each information token comprises an address identifying at least one particular recipient of the information token.

9. A method of communicating information between vehicles, comprising:
   providing a vehicle, comprising:
      a vehicle-borne short-range receiver;
      a vehicle-borne short-range transmitter;
      an onboard computer system;

receiving, at the vehicle-borne short-range receiver, information tokens from a token transmitter within a predefined range without regard for an identity of the token transmitter; and transmitting, from the vehicle-borne short-range transmitter, at least some of the information tokens to any token receiver within a predefined range and only if the at least some of the information tokens are determined, by the onboard computer system, to be private tokens intended for at least one particular recipient designated in an address field of the private tokens.

10. The method of claim 9, wherein transmitting comprises transmitting the information tokens to at least one of a proximately located vehicle and a public access point to a wide area network.

11. The method of claim 10, wherein the wide area network is the Internet.

12. The method of claim 9, wherein the information tokens each contain at least one of: sensor information collected by a sensor of another vehicle and emergency information transmitted from the another vehicle.

13. The method of claim 9, wherein the information tokens each contain sensor information collected by a sensor of another vehicle and further comprising:

determining whether the token transmitter is moving in an opposite direction relative to the vehicle; and if so, outputting the sensor information to an occupant of the vehicle via an output device.

14. The method of claim 9, wherein the transmitting of the at least some of the information tokens determined to be private tokens is done without reading data content of the information tokens.

15. A method of communicating information between vehicles, comprising:

providing a vehicle, comprising:
a vehicle-borne short-range receiver;
a vehicle-borne short-range transmitter; and
an onboard computer system;

receiving, at the vehicle-borne short-range receiver, information tokens from a token transmitter within a predefined range without regard for an identity of the token transmitter;

upon receiving an information token, determining whether the information token is public or private;

if the information token is public, reading, by the onboard computer system, data content of the information token; and if the information token is private, transmitting, from the vehicle-borne short-range transmitter, the information token to any token receiver within a predefined range without reading the data content of the information token.

16. The method of claim 15, wherein transmitting comprises transmitting the information tokens to at least one of another proximately located vehicle and a public access point to a wide area network.

17. The method of claim 16, wherein the wide area network is the Internet.

18. A vehicle-borne system, comprising:
a short-range transmitter;
a short-range receiver; and
an onboard computer system communicably connected to the short-range transmitter and the short-range receiver and which, when executing a token processing program, is configured to perform an operation comprising:

(a) receiving, at the short-range receiver, information tokens from a token transmitter within a predefined range without regard for an identity of the token transmitter; and (b) transmitting, from the short-range transmitter, at least some of the information tokens to any token receiver within a predefined range only if the at least some of the information tokens are determined, by the onboard computer system, to be private tokens intended for at least one particular recipient designated in an address field of the private tokens.

19. The system of claim 18, further comprising a plurality of sensors communicably connected to the onboard computer system and wherein the operation performed by the onboard computer system further comprises:

creating information tokens containing sensor information; and transmitting the information tokens via the short-range transmitter.

20. The system of claim 18, wherein transmitting comprises transmitting the information tokens to at least one of a proximately located vehicle and a public access point to a wide area network.

21. The system of claim 20, wherein the wide area network is the Internet.

22. The system of claim 18, wherein the short-range transmitter is selected from at least one of 802.11a, 802.11b and Bluetooth transmitters.

23. The system of claim 18, wherein the information tokens each contain at least one of: sensor information collected by a sensor of another vehicle and emergency information transmitted from the another vehicle.

24. The system of claim 18, wherein the information tokens each contain sensor information collected by a sensor of another vehicle and wherein the operation further comprises:

determining whether the token transmitter is moving in an opposite direction relative to the onboard computer system; and if so, outputting the sensor information to an output device connected to the onboard computer system, wherein the output device outputs information in a format understandable by a human operator.

25. The system of claim 18, wherein the transmitting of the at least some of the information tokens determined to be private tokens is done without reading data content of the information tokens.

26. A vehicle-borne system, comprising:
a short-range transmitter;
a short-range receiver; and
an onboard computer system communicably connected to the short-range transmitter and the short-range receiver and which, when executing a token processing program, is configured to perform an operation comprising:

(a) receiving, at the short-range receiver, information tokens from a token transmitter within a predefined range without regard for an identity of the token transmitter;

(b) upon receiving an information token, determining whether the information token is public or private;

(c) if the information token is public, reading data content of the information token; and (d) if the information token is private, transmitting, from the short-range transmitter, the information token to any token receiver within a predefined range without reading the data content of the information token.

27. The system of claim 26, wherein transmitting comprises transmitting the information tokens to at least one of another proximately located vehicle and a public access point to a wide area network.

28. The system of claim 27, wherein the wide area network is the Internet.

29. A method of communicating information between vehicles, comprising:
   providing a vehicle, comprising:
      a vehicle-borne short-range receiver;
      a vehicle-borne short-range transmitter; and
      an onboard computer system;
   receiving, at the vehicle-borne short-range receiver, information tokens from a token transmitter within a predefined range without regard for an identity of the token transmitter and without regard for whether the received information tokens are addressed to a particular recipient; and
   transmitting, from the vehicle-borne short-range transmitter, at least some of the information tokens to a public access point to the Internet, within a predefined range, without regard for whether the information tokens are addressed to a particular destination.

30. The method of claim 29, further comprising transmitting at least some of the information tokens to another proximately located vehicle.

31. A vehicle-borne system, comprising:
   a short-range transmitter;
   a short-range receiver; and
   an onboard computer system communicably connected to the short-range transmitter and the short-range receiver and which, when executing a token processing program, is configured to perform an operation comprising:
      (a) receiving, at the short-range receiver, information tokens from a token transmitter within a predefined range without regard for an identity of the token transmitter and without regard for whether the received information tokens are addressed to a particular recipient; and
      (b) transmitting, from the short-range transmitter, at least some of the information tokens to a public access point to the Internet, within a predefined range, without regard for whether the information tokens are addressed to a particular destination.

32. The system of claim 31, wherein the onboard computer system is further configured to transmit at least some of the information tokens to another proximately located vehicle.

* * * * *